United States Patent [19]

Kiss

[11] 4,432,716

[45] Feb. 21, 1984

[54] APPARATUS FOR MOULDING THREE-DIMENSIONALLY SHAPED MOULDED ARTICLES FROM BINDER-CONTAINING WEB-LIKE NON-WOVEN FABRICS

[75] Inventor: Günter H. Kiss, Berlin, Fed. Rep. of Germany

[73] Assignee: Lignotock Verfahrenstechnik GmbH, Berlin, Fed. Rep. of Germany

[21] Appl. No.: 245,948

[22] Filed: Mar. 20, 1981

[51] Int. Cl.³ .............................................. B28B 7/36
[52] U.S. Cl. ...................................... 425/89; 425/383
[58] Field of Search ................ 425/89, 182, 405, 368, 425/388, 383, 393, 412, DIG. 48; 264/316

[56] References Cited

U.S. PATENT DOCUMENTS

| | | | |
|---|---|---|---|
| 1,587,462 | 6/1926 | Adams et al. | 264/316 |
| 2,974,366 | 3/1961 | Bauman | 425/398 |
| 3,071,180 | 1/1963 | Finger et al. | 425/89 |
| 3,170,192 | 2/1965 | Oesterheld | 425/388 |
| 3,685,931 | 8/1972 | Craven et al. | 425/89 |
| 3,936,254 | 2/1976 | Sawada et al. | 425/89 |
| 3,956,056 | 5/1976 | Boguslauski et al. | 425/101 |
| 4,075,359 | 2/1978 | Thulia | 425/89 |
| 4,221,556 | 9/1980 | Kiss | 425/182 |

FOREIGN PATENT DOCUMENTS 2701480 7/1978 Fed. Rep. of Germany .
2713527 9/1978 Fed. Rep. of Germany .
53-112960 10/1978 Japan .................................. 264/316

OTHER PUBLICATIONS

Research on the Possibilities of Manufacture and the Characteristics of Wood Shaving Moulded Articles, Particularly for Making Furniture, W. Klauditz; E. Stegmann and W. Kratz, 1965 PP37/38.

*Primary Examiner*—Jay H. Woo
*Attorney, Agent, or Firm*—Basile, Weintraub & Hanlon

[57] ABSTRACT

An apparatus for moulding three-dimensionally shaped moulded articles from binder-containing web-like non-woven fabrics for transferring by pressure and heat action the shaping forces of at least one mould half acting on at least one electrically deformable supporting layer to the web-like non-woven fabrics, the supporting layer being fixed to a frame structure or held in movable manner with respect to the mould which makes it possible to match the deformation behavior of the stabilizing supporting layer in an optimum manner to the deformation behavior of the non-woven fabrics without there being any risk of over-elongation of the supporting layer thereby enabling the latter to be used repeatedly. For this purpose the supporting layer is fixed wholly or partly to the component by means of the additional resilient elastic stretching elements, said stretching elements, e.g. springs, rubber strips or plastic cords, having regulatable resilience characteristics, e.g. by pneumatic or hydraulic cylinders.

7 Claims, 4 Drawing Figures

APPARATUS FOR MOULDING THREE-DIMENSIONALLY SHAPED MOULDED ARTICLES FROM BINDER-CONTAINING WEB-LIKE NON-WOVEN FABRICS

BACKGROUND OF THE INVENTION

1. Field of the Invention

The invention relates to an apparatus for moulding moulded articles and specifically to an apparatus for moulding three-dimensionally deformed moulded articles from binder-containing web-like non-woven fabrics.

2. Description of the Prior Art

It is known that during the shaping of fibrous materials in the form of stretched materials, such as binder-containing cellulose chips, moulded articles can be produced by pressure and heat action, but that even with relatively small bending radii it is to be expected that a uniform displacement of the structure of the material beyond the average stretching length can no longer be ensured. To eliminate this problem a cold deformation takes place prior to the actual moulding process, the pre-mould being provided with a rubber covering which, as an elastic supporting surface, is intended to lead to a better distribution of the deformation stresses (Klauditz, W., E. Stegmann and W. Kratz: Untersuchungen über die Herstellbarkeit und Eigenschaften einfacher Holzspan-Formteile, insbesondere für den Möbelbau—Research on the possibilities of manufacture and the characteristics of wood shaving moulded articles, particularly for making furniture—Cologne and Opladen 1965, pp. 37/38).

This procedure is further developed by a known apparatus for producing pre-shaped articles from lignocellulose tangled fibre fleeces with stepwise shaping in moulds. The shaping surface thereof comprises a plurality of partial surfaces which can be moved relative to one another, the shaping partial surfaces of at least one mould half jointly acting on at least one elastically deformable, continuous intermediate layer in the form of a supporting layer. The shaping forces are transferred by the supporting layer to the fibrous fleece, the elastically deformable supporting layer, e.g. in the form of an endless belt, being fixed to a frame structure or held in movable manner with respect to the mould (DOS No. 27 01 480).

This known apparatus has advantageously made it possible to mould flat non-woven fabrics, i.e. those moulding blanks which can only be subject to limited tensile and crushing forces during the moulding process, to relatively highly curved moulded articles without the aforementioned disadvantages occurring. The locally increased expansion and crushing forces are largely absorbed and distributed by the elastically deformable supporting layer before the shaping forces can be transferred to the non-woven fabric. However, in the case of even greater local stretching the inherent elasticity of the supporting layer is often inadequate to cancel out its elongation so that the supporting layer becomes unusable after a relatively short time, which is disadvantageous from the cost standpoint. A change of the supporting layer material to give a greater elasticity only helps to a limited extent, because although it is necessary for these stabilizing supporting layers to easily adapt to any desired three-dimensional shape with in part considerable local elongation zones, whilst as far as possible any permanent deformation is rapidly cancelled out after each moulding process by the actual supporting layer material, the stabilizing action of the supporting layer, i.e. its surface distribution of local elongation and crushing, must as far as possible be adapted to the fibre covering length in the material to be deformed in order to prevent the formation of tears and unallowed thinning out, which is in turn only possible with a supporting layer made from a material whose inherent elasticity is not too low. Thus, although supporting layers with a relatively small elastic extensibility permit an advantageous local distribution of shear forces and the like over the stressed areas of the non-woven fabric to be deformed, their elasticity is not then adequately reversible to be able to successively use the same supporting layer for a plurality of moulding processes.

This disadvantage is also encountered with another known apparatus (DOS No. 27 13 527) in which inter alia fabrics made from stabilizing layers or deformable supporting layers are used and which is characterized in that they have no significant inherent elasticity.

The problem of the present invention is to so further develop and improve an apparatus for moulding three-dimensionally deformed moulded articles such that the deformation behaviour of the stabilizing supporting layer can be matched in an optimum manner to the deformation behaviour of the non-woven fabric without there being any risk of over-elongation of the supporting layer in order to enable the latter to be used repeatedly.

SUMMARY OF THE INVENTION

The resilient fixing of the stabilizing supporting layer has the advantage that via the resilience of the elastic stretching elements it can follow the movement of shape adaptation without it being necessary to use its inherent elasticity until the moulding process is at an end. This makes it possible to use stabilizing supporting layers with a reduced inherent elasticity, but which is still adequate for the local distribution of the surface forces over the non-woven fabric. As a result the supporting layer can be formed from fabrics made from threads with a relatively low elastic deformability.

There are numerous fabrics which, as a result of the deformability of their individual meshes, have an overall deformability which, mainly in the case of a reversible behaviour of the surface distribution, takes account of the local crushing and tensile forces in the range of the permitted displacement of the fibre overlap in the fleece. Thus, the mesh deformation of the fabric is only elastically stressed to the extent that the fabric reassumes its original shape following stress relief. Even in local areas the fabric deformability is predetermined by the fabric type, thread thickness and mesh shape and, by means of stretching elements, can be adapted in an optimum manner to the deformation behaviour of the fibrous material. However, the inadequate elastic mesh deformation of the fabric for the overall moulding process is fulfilled in optimum manner by the elastically resilient attachment of such fabric supporting layers in connection with the function of the stabilizing layers, i.e. the adequate local elongation is initially distributed over a larger area of the fibrous material in a uniform manner via the additional elastic stretching elements before the shaping forces are transmitted to the non-woven fabric by means of the fabric layer. The elongation behaviour of stabilizing supporting layers with a greater inherent elasticity, such as e.g. rubber-elastic layers can be influenced by the resilience of the additional resilient elastic stretching elements being selected in such a way that it is at least temporarily lower than the force required for the elastic elongation of the supporting layer. Thus, the overall elongation of the supporting layer can be reduced and can be advantageously adapted to the requirements of the non-woven fabric.

The stabilizing supporting layers can be resiliently fixed either to the shaping tool or to a separate component e.g. in a punctiform or linear manner. Thus, unlike in the prior art, the supporting layer is no longer fixed directly to the mould or to a component secured thereto, but is held by the stretching element having additional resilient elastic properties.

A technically simple and advantageous construction of these stretching elements for the stabilizing supporting layer is in the form of rubber-elastic or viscoelastic strips or plastic cords, or also springs. The elasticity constant or inherent elasticity of such stretching elements is preselectable or can be so adjusted that only limited holding forces are exerted on the stabilizing supporting layer at the start of deformation and they increase as deformation proceeds. The supporting layer initially follows the deformation without any significant inherent elongation and only when shaping has progressed further is account taken of the extensibility of the supporting layer. Thus, it is possible to adapt the overall elongation of a stabilizing supporting layer with higher elasticity to the fibre covering length in the material or to use supporting layers with a lower inherent elasticity. The maximum forces exerted by the elastically resilient stretching elements for fixing the supporting layer can be selected in such a way that there is no permanent deformation in the supporting layer.

A further development of the apparatus, particularly for producing moulded articles with a complicated geometry and greater deformation, comprises giving the stretching elements of the supporting layer regulatable resilience characteristics, e.g. by pneumatic or hydraulic cylinders.

A further possibility of adaptation is provided by using stretching elements with different resilience characteristics for suspending or attaching the stabilizing supporting layer. Thus, it can, for example, be advantageous to use springs with different elasticity constants in order to locally adapt the suspension or attachment forces on the supporting layer to the conditions of the moulded parts. Much the same can be achieved with differing distribution of identically acting stretching elements.

It is easy to carry out and advantageous for many shaping tasks if the stabilizing supporting layer is only unidirectionally fixed, i.e. only in the longitudinal or transverse directions to the resiliently elastic stretching elements to the mould or to a corresponding component.

If the stabilizing supporting layer is stretched as an endless belt between two or more rollers, a unidirectional resilience of the suspension is obtained in that at least one of the rollers is flexibly mounted. The flexibility of the mounting can be regulated by spring elements or pneumatic and hydraulic cylinders or by at least one roller performing a torque-controllable reversal.

BRIEF DESCRIPTION OF THE DRAWINGS

One example of a mode of practicing the present invention is illustrated in the attached drawing in which.

DESCRIPTION OF THE PREFERRED EMBODIMENTS

Figure 1:
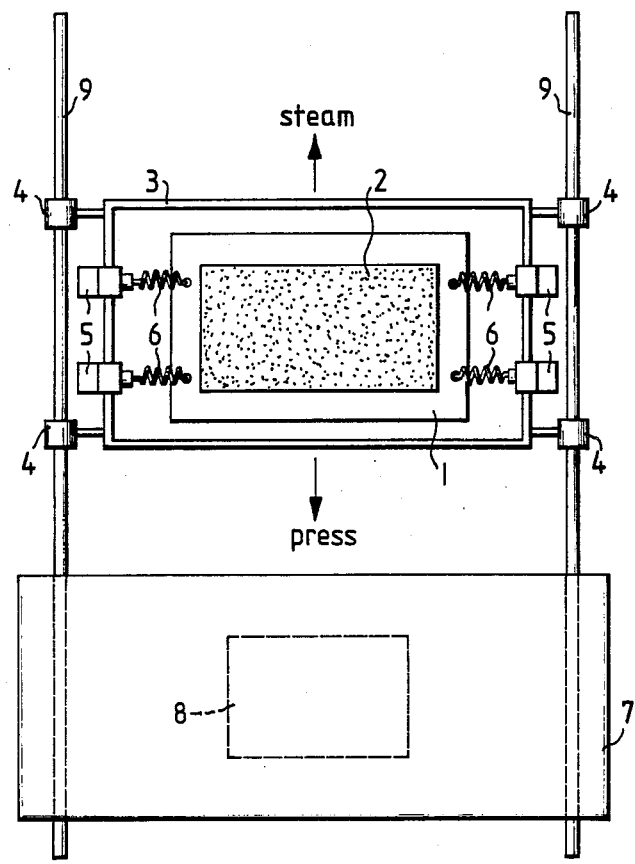
FIG. 1 is a plan view of the apparatus constructed in accordance with the teachings of the present invention.

Referring now to the drawings, and to FIG. 1 in particular, there is illustrated an apparatus for forming three-dimentional articles from non-woven fabrics. The apparatus includes a stabilizing support layer 1 which is fastened to a supporting means or carrier frame 3 by resilient stretching means 6, such as four elastic elements or springs. The resilient stretching elements 6 are connected to the frame 3 by means for regulating the resilient characteristics of the springs 6. Preferably, the regulating means comprises fluid operated cylinders 5, such as hydraulic or pneumatic cylinders, which are illustrated in their final position in FIG. 1. A matlike fiber material 2 is placed on support layer 1. With the aide of guide rods 9 and guide sleeves 4, the carrier frame 3 may be moved in a horizontal direction, for example, in order to transport the fiber material 2 between a steaming station and the press 7. The press 7 contains the preforming equipment, indicated in general by reference number 8, which consists of an upper tool or mould half 8' and a lower tool or mould half 8'', as shown in FIGS. 2, 3 and 4.

In a preferred embodiment, the stabilized support layer 1 consists of a fabric which has little elasticity in the illustrated direction of stress. As a result of mesh deformation, however, it has sufficient form adjusting capacity for a particular direction so as to transmit the shaping forces between the tool or mould halves to the fiber material 2.

Since the regulating means or cylinders 5 which are connected to the carrier 3 frame in a stationary manner are in their end or final position, the regulating means imparts a prestress on the resilient stretching means or springs 6 such that the support layer 1 can transport the fiber material 2 without hanging down during such transportation.

Figure 2:
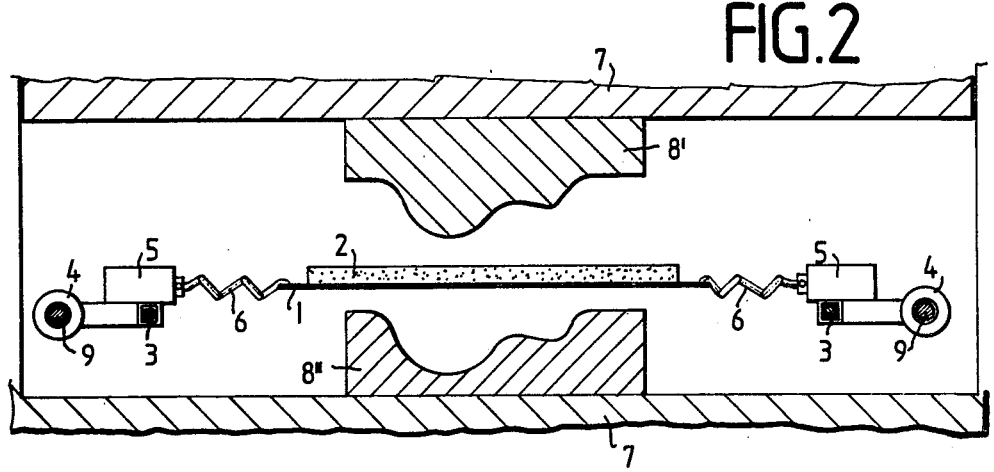
FIGS. 2, 3 and 4 are partial, cross sectional views through the forming press and mould illustrating the sequential operational steps of the apparatus of the present invention.
Figure 3:
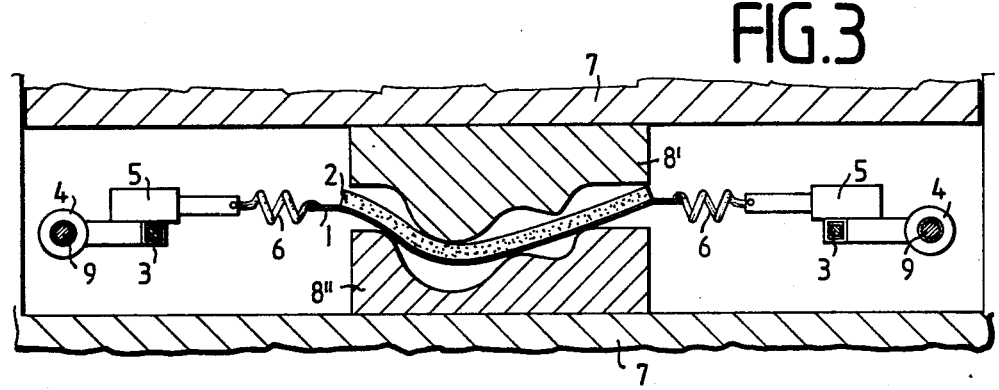
Figure 4:
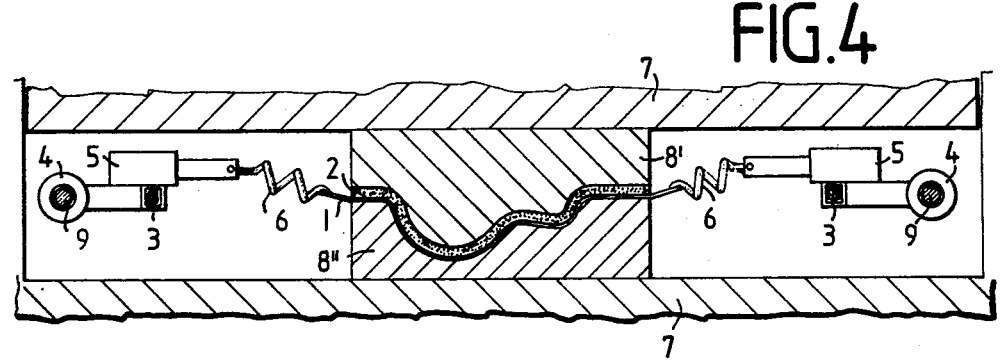

Referring now to FIGS. 2, 3 and 4, the operational sequence of steps of the apparatus of the present invention will now be described. FIG. 2 illustrates the status or condition of the apparatus of the present invention when the fiber material 2 is introduced into the opening formed between the upper and lower mould halves 8' and 8'' which are in their initial spaced-apart position.

As shown in FIG. 3, the initial step in forming a three-dimentional article from the fiber material 2 begins with a downward movement of the upper mould half 8' towards the lower mould half 8''. During such press movement, the regulating means or cylinders 5 are pressurized and moved to the position illustrated in FIG. 3. This process continuously reduced the tension on the resilient stretching means or springs 6. Thus, the stress on the support layer 1 is reduced whereby compressive forces are transferred through the support layer 1 to the fiber material 2 during the preliminary forming process which counteracts the tensile forces in the fiber material 2 incurred during performing and prevents the formation of cracks in the fiber material 2. At the same time, the form adjusting capacity of the support layer 1 is improved by reducing the longitudinal stress in the support layer 1 and is adjusted to the desired course or operation of the preliminary forming.

The final step in the operational sequence of the present invention is illustrated in the FIG. 4 in which upper half 8' of the preforming tool has moved to its lower position in close conformity with the lower mould half 8" thereby forming the fiber material 2 into the compressed preformed part 2'. During the end phase of the preforming process, the resilient stretching means or springs 6 continue to exert a slight longitudinal tension on the support layer 1. This pressure is selected so as to be commensurate with the forming properties of the fiber material 2.

After completion of preforming process, the upper mould half 8' moves away from the lower mould half 8" to the spaced apart, open position and pressure is applied to the cylinders 5 to move them to their final end position, as shown in FIG. 2. This pressure results in increased prestress being imparted on the support layer 2 via the springs 6 which results in the part 2' being released from the lower part 8" of the performing mould. The completed part can then be removed from the press 7 by horizontal shifting of the carrier frame 3 along the rod guides 9 to the position shown in FIG. 1.

I claim:

1. An apparatus for forming three-dimensional articles from non-woven fabrics comprising:
    a mould;
    the mould having first and second mould halves, at least one of which has a forming surface thereon, the first and second mould halves being movable from a spaced apart position to a closely conforming position to form the three-dimensional article;
    an elastically deformable support layer for transmitting the shaping forces from at least one of the first and second mould halves to the fabric;
    means for supporting the support layer between the first and second mould halves; and
    means, attached to the supporting means and the support layer, for resiliently stretching the support layer during the moulding process such that the support layer follows the shaping forces without using its inherent elasticity until the moulding process nears completion.

2. The apparatus of claim 1 wherein the supporting means comprises an elastic element.

3. The apparatus of claim 1 further including means for regulating the resilient characteristics of the supporting means.

4. The apparatus of claim 3 wherein the regulating means comprises fluid-operated cylinders.

5. The apparatus of claim 2 further including a plurality of elastic elements, certain of the elastic elements having different resilient characteristics.

6. The apparatus of claim 1 wherein the supporting means resiliently supports the support layer in one of the longitudinal and transverse directions.

7. The apparatus of claim 1 wherein:
    the support layer is an endless belt; and
    the supporting means comprises two spaced rollers movably supporting the belt, at least one of the rollers being flexibly mounted and having a torque-controllable reversible direction movement.

* * * * *